US012333516B2

(12) United States Patent
Ollikainen et al.

(10) Patent No.: US 12,333,516 B2
(45) Date of Patent: Jun. 17, 2025

(54) PRIVACY-PRESERVING PAYMENTS FOR PEER-TO-PEER NETWORKS

(71) Applicant: Adeia Guides Inc., San Jose, CA (US)

(72) Inventors: Ville Ollikainen, Vihti (FI); Anni Karinsalo, Oulu (FI); Pekka Koskela, Oulu (FI); Markku Kylänpää, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 138 days.

(21) Appl. No.: 18/216,642

(22) Filed: Jun. 30, 2023

(65) Prior Publication Data
US 2025/0005552 A1 Jan. 2, 2025

(51) Int. Cl.
G06Q 20/22 (2012.01)
G06Q 20/36 (2012.01)
(Continued)

(52) U.S. Cl.
CPC ......... G06Q 20/223 (2013.01); G06Q 20/367 (2013.01); G06Q 20/38215 (2013.01);
(Continued)

(58) Field of Classification Search
CPC ............... G06Q 20/223; G06Q 20/367; G06Q 20/38215; G06Q 20/3825; G06Q 20/3829; G06Q 20/401; G06Q 2220/00
(Continued)

(56) References Cited

U.S. PATENT DOCUMENTS 11,935,040 B1 * 3/2024 Dahn ................. G06Q 20/3829
2008/0154782 A1   6/2008 Kang et al.
(Continued)

FOREIGN PATENT DOCUMENTS

GB   2622359 A  *  3/2024  ............. G06F 21/64
WO   2018/125234 A1   7/2018
WO   2022/118263 A1   6/2022

OTHER PUBLICATIONS

Catalano et al. "A Fair Micro-Payment Scheme for Profit Sharing in P2P Networks", 2004 International Workshop on Hot Topics in Peer-to-Peer Systems, 8 pages (Year: 2004).*
(Continued)

*Primary Examiner* — James D Nigh
(74) *Attorney, Agent, or Firm* — Haley Guiliano LLP

(57) ABSTRACT

A peer-to-peer content provision network is disclosed which implements a privacy-preserving payment mechanism for rewarding actors in the network (for example, a content supplier, a content distributor and storage-contributing peers). To reward some or all of those actors, a user device obtains, from a token service, anonymous digital payment tokens which include an ephemeral public key. Payment is achieved by adding an assignment layer to the token which involves combining a payee ephemeral public key with the token, and applying a digital signature to the combination using the ephemeral private key corresponding to the ephemeral public key in the token. Subsequent assignments can be made by the payee by adding a further assignment layer to the token using a payee ephemeral private key which pairs with the payee ephemeral public key in the received token. A payment service can divide a payment from the user between actors in the network.

20 Claims, 9 Drawing Sheets

(51) Int. Cl.
    G06Q 20/38     (2012.01)
    G06Q 20/40     (2012.01)
    G06F 21/10     (2013.01)
(52) U.S. Cl.
    CPC ..... *G06Q 20/3825* (2013.01); *G06Q 20/3829* (2013.01); *G06Q 20/401* (2013.01); *G06F 21/10* (2013.01); *G06Q 2220/00* (2013.01)
(58) Field of Classification Search
    USPC .......................................................... 705/65
    See application file for complete search history.

(56) References Cited

U.S. PATENT DOCUMENTS

| | | | | |
|---|---|---|---|---|
| 2023/0097712 | A1* | 3/2023 | Sullivan | H04W 12/106 713/171 |
| 2025/0005568 | A1* | 1/2025 | Pettit | G06Q 20/3825 |

OTHER PUBLICATIONS

Ali, S. T., et al., "The Nuts and Bolts of Micropayments: a Survey," [retrieved from URL: https://arxiv.org/abs/1710.02964], 19 pages (2017).
Anonymous, "DSAlliance Decentralized Storage Alliance, Enterprise Storage Alliance for the Decentralized Web,," [retrieve from URL: https://dsalliance.io/], 5 pages (2023).
Anonymous, "Filecoin: A Cryptocurrency Operated File Storage Network," [retrieved from URL: https://filecoin.io/filecoin-jul-2014.pdf], 8 pages (2014).
Anonymous, "Filecoin: A Decentralized Storage Network. Protocol Labs," [retrieved from URL: https://filecoin.io/filecoin.pdf], 36 pages (2017).
Anonymous, "Reiden Overview," [retrieved from URL: https://raiden.network/faq.html] 1 page (2023).
Anonymous, "Security protocol notation," Wikipedia, 2 pages (2023).
Anonymous, "Storj: A Decentralized Cloud Storage Network Framework,"[retrieved from URL: https://www.storj.io/storjv3.pdf], (2018).
Anonymous, Project Xanadu, Wikipedia article, [retrieved from URL: https://en.wikipedia.org/wiki/Project_Xanadu], 1-5 (2023).
Bano, S., et al., "Consensus in the Age of Blockchains,", University College London [retrieved from URL: https://doi.org/10.48550/arXiv.1711.03936], 17 pages (2017).
Bernardi, S., "The analysis Filecoin doesn't want you to read," [retrieved from URL: https://tokeneconomy.co/the-analysis-filecoin-doesnt-want-you-to-read-e60d5243f17c] 15 pages (2017).
Catalano, D., et al., "A Fair Micro-Payment Scheme for Profit Sharing in P2P Networks," 2004 International Workshop on Hot Topics in Peer-to-Peer Systems, 8 pages (2004).
Chaudhary, K., et al, "P2p-netpay: an off-line micro-payment system for content sharing in p2p-networks," Journal of Emerging Technologies in Web Intelligence, 1(1): 46-54 (2009).
Chiesa, A., et al., "Decentralized Anonymous Micropayments," International Conference on the Theory and Application of Cryptographic Techniques, 72 pages (2017).
Chothia, T., "Secure Communication, Computer Security, Lecture 8," University of Birmingham, 31 pages (2012).
Cohen, B., "Incentives Build Robustness in BitTorrent," [retrieved from URL: https://www.bittorrent.org/bittorrentecon.pdf], 5 pages (2003).
Foo, E., et al., "A payment scheme using vouchers," Financial Cryptography. Lecture Notes in Computer Science, 465:103-121(1998).
Frankendfield, J., "Micropayments: What it is, How it Works in Fintech," [retrieved from URL: https://www.investopedia.com/terms/m/micropayment.asp], 5 pages (2021).
Gabber, E., et al., "Agora: A minimal distributed protocol for electronic commerce," The Second USENIX Workshop on Electronic Commerce Proceedings, 223-232 (1996).

Garcia, F.D., et al., "Off-line karma: A decentralized currency for peer-to-peer and grid applications," Applied Cryptography and Network Security: Third International Conference, Proceedings 3:364-377 (2005).
Glassman, S., et al., "The Millicent Protocol for Inexpensive Electronic Commerce," The 4th World Wide Web Conference, 16 pages (1995).
Herzberg, A., et al., "Minipay: charging per click on the web," Computer Networks and ISDN Systems, 29(8):939-951 (1997).
Jain M., et al., "Peer2peer (p2p) micropayments: A survey and critical analysis," DA-IICT, Gandhinagar, 9 pages (2008).
Lakhani, V. H., et al., "Fair Incentivization of Bandwidth Sharing in Decentralized Storage Networks," 2022 IEEE 42nd International Conference on Distributed Computing Systems Workshops (ICDCSW), 39-44 (2022).
Lind, J., et al., "Teechain: a secure payment network with asynchronous blockchain access," Proceedings of the 27th ACM Symposium on Operating Systems Principles, 63-79. (2019).
Long, J., et al., "Off-Chain Micropayment Pool for High-Throughput Bandwidth Sharing Rewards," 2021 IEEE International Conference on Blockchain and Cryptocurrency (ICBC), 1-6, (2021).
Madhusudan, A., et al. "Nirvana: Instant and Anonymous Payment-Guarantees." Cryptology ePrint Archive, 46 pages (2022).
Mavroudis, V., et al., "Snappy: Fast on-chain payments with practical collaterals," arXiv preprint arXiv:2001.01278, 18 pages (2020).
Poon, J., et al., "The Bitcoin Lightning Network: Scalable Off-Chain Instant Payments," J version 0.5.9.2, 1-59 (2016).
Poutanen, T., et al.,"NetCents: A Lightweight Protocol for Secure Micropayments," USENIX Workshop on Electronic Commerce, 25-36 (1998).
Rivest, R.L., "Peppercoin Micropayments," Peppercoin micropayments. In International Conference on Financial Cryptography, 1-8 (2004).
Rivest, R.L., et al., "PayWord and MicroMint: Two simple micropayment schemes," International workshop on security protocols, 69-87 (1996).
Sarkar, A., "How to keep your cryptocurrency safe after the FTX collapse,", Coin Telegraph, [retrieved from URL: https://cointelegraph.com/news/how-to-keep-your-cryptocurrency-safe-after-the-ftx-collapse], 14 pages (2022).
Sirbu, M.S., et al., "NetBill: An internet commerce system optimized for network-delivered services," IEEE Personal Communications, 2(4):34-39 (1995).
Tang, L., et al., "A tool for micropayments on the World Wide Web," 6th USENIX Security Symposium, 1-8 (1996).
Vishnumurthy, V., et al., "KARMA : A Secure Economic Framework for Peer-to-Peer Resource Sharing," Department of Computer Science, Cornell University, 1-6 (2003).
Wagemann, C., "What Is a Micropayment?," The Balance, [retrieved from URL: https://www.thebalancemoney.com/micropayment-5205583], 1-6 (2021).
Wei, K., et al., "WhoPay: A Scalable and Anonymous Payment System for Peer-to-Peer Environments," 26th IEEE International Conference on Distributed Computing Systems (ICDCS'06), 10 pages (2006).
Yang, B., et al., "PPay: micropayments for peer-to-peer systems," Proceedings of the 10th ACM conference on Computer and communications security (CCS '03), Association for Computing Machinery, 300-310 (2003).
Zuo, M., et al., "Constructing fair-exchange p2p file market," International Conference on Grid and Cooperative Computing, 941-946 (2005).
U.S. Appl. No. 18/240,728, filed Aug. 31, 2023, Markku Kylänpää.
3-D Secure, Wikipedia, [retrieved from URL: https://en.wikipedia.org/wiki/3-D_Secure on Nov. 9, 2023] 7 pages.
Antonopoulos; "Mastering Bitcoin: Programming the Open Blockchain", O'Reilly, Second edition, Jul. 21, 2017, pp. 1-404.
AppleCash, [retrieved from URL: https://www.apple.com/apple-cash/ on Nov. 9, 2023] 9 pages.
U.S. Appl. No. 18/244,721, filed Sep. 11, 2023, "Privacy-Preserving Payment Exchange".
B. Schneier, "Applied cryptography, protocols, algorithms and source code in C," Applied Cryptography, pp. 139-147, 174 (1996).

(56) References Cited

OTHER PUBLICATIONS

B. Wtiscka, "Blik. Where did the Polish mobile payment system come from and how does it work?", pp. 1-8, (Dec. 3, 2022), XP093228277.

Bennet, B., et al., "Overlap Between the GDPR and PSD2," Inside Privacy, 6 pages (2018).

Carbunar B. et al., "Conditional e-payments with transferability", Journal of Parallel and Distributed Computing, Elsevier, Amsterdam, NL, vol. 71, No. 1, Jan. 1, 2011, pp. 16-26.

Cashapp, [retrieved from URL: https://cash.app/ on Nov. 9, 2023] 1 page.

Complete Guide to GDPR compliance, [retrieved from URL: https://gdpr.eu/ on Nov. 9, 2023] 4 pages.

Compulsive gamlbing, Mayo Clinic, [retrieved from URL: https://www.mayoclinic.org/diseases-conditions/compulsive-gambling/symptoms-causes/syc-20355178 on Nov. 9, 2023] 10 pages.

David Chaum, Wikipedia, [retrieved from URL: https://en.wikipedia.org/wiki/David_Chaum on Nov. 9, 2023] 9 pages.

Ecash, Wikipedia, [retrieved from URL: https://en.wikipedia.org/wiki/Ecash on Nov. 9, 2023] 4 pages.

Edge, J., "Tornado Cash and collateral damage," [retrieved from ULR: https://lwn.net/Articles/904960/] 51 pages (2022).

Hornle, J., et al., "Evaluation of regulatory tools for enforcing online gambling rules and channelling demand towards controlled offers," European Commission, Directorate-General for Internal Market, Industry, Entrepreneurship and SME, 167 pages (2018).

Legislation helps to prevent gambling-related harm, Ministry of the Interior Finland, [retrieved from URL: https:// intermin.fi/en/police/gambling on Nov. 9, 2023] 3 pages.

McVitie, S., "Ubuntu package libgfshare git repository," [retrieved from URL: https://salsa.debian.org/debian/libgfshare on Nov. 9, 2023] 3 pages.

Mikalauskas, E., "The ultimate guide to safe and anonymous online payment methods in 2023," CyberNews, 21 pages (2022).

Morillo, P., et al., "Weighted threshold secret sharing schemes," Information Processing Letters, 70:211-216 (1999).

PayGoogle—a better way to pay, by Google Pay Home page, [retrieved from URL: https://pay.google.com/ on Nov. 9, 2023] 1 page.

Payment Services Directive 2 (PSD2): Directive 2015/2366/EU (PSD2), [retrieved from URL: https://www.eba.europa.eu/regulation-and-policy/single-rulebook/interactive-single-rulebook/5402 on Nov. 9, 2023] 8 pages (2015).

Paypal, [retrieved from URL: https://paypal.com/ on Nov. 9, 2023] 7 pages.

Paysafecard, Wikipedia, [retrieved from URL: https://en.wikipedia.org/wiki/Paysafecard on Nov. 9, 2023] 11 pages.

Rusell, A., "Micro-betting: a dangerous form of gambling luring in vulnerable Australians," The Conversation, 4 pages (2018).

Secure Electronic Translation, Wikipedia, [retrieved from URL: https://en.wikipedia.org/wiki/Secure_Electronic_Transaction on Nov. 9, 2023] 3 pages.

SET Secure Electronic Transaction Specification, Book 2: Programmer's Guide, [retrieved from URL: https://www.maithean.com/docs/set_bk2.pdf] 629 pages (1997).

SET Secure Electronic Transaction Specification, Book 3: Formal Protocol Definition, [retrieved from URL: https://www.maithean.com/docs/set_bk3.pdf] 262 pages (1997).

SET Secure Electronic Transaction Specification: Book 1: Business Description, [retrieved from URL: https://www.maithean.com/docs/set_bk1.pdf] 80 pages (1997).

Shamir, A., "How to share a secret," Commun. ACM 22, 11: 612-613 (1979).

Stallings, W., "The SET Standard & E-Commerce," [retrieved from URL: https://www.drdobbs.com/the-set-standard-e-commerce/184404309] 4 pages (2000).

Tornado Cash, Wikipedia, [retrieved from URL: https://en.wikipedia.org/wiki/Tornado_Cash on Nov. 9, 2023] 4 pages.

U.S. Treasury Sanctions Notorious Virtual Currency Mixer Tornado Cash, [retrieve from URL: https://home.treasury.gov/news/press-releases/jy0916] 4 pages (2022).

Venmo—Fast, safe, social payments, [retrieved from https://venmo.com on Nov. 9, 2023], 18 pages.

\* cited by examiner

PRIVACY-PRESERVING PAYMENTS FOR PEER-TO-PEER NETWORKS

BACKGROUND

The present disclosure relates to methods of payment for content provision in peer-to-peer networks. In particular, the disclosure relates to methods of payment which, while routed through a content distributor, at least obscure the consumer's identity to the content distributor.

The majority of digital content provision today involves a content supplier providing digital content to a content distributor to which consumers subscribe. As in other fields, many companies involved in content provision operate a business model which relies on gathering data on consumers' habits and either using that data to pitch relevant services to the consumer, or selling that data onto third parties. Digital interaction now present in content provision means that collecting a large volume of data about a consumer's activities has become much easier.

In terms of network architecture, the present-day norm in content delivery is for content distributors to use Content Delivery Networks to distribute content to servers close to media consumers, so that media consumers can enjoy a high quality of network service when downloading or streaming media to their device.

However, by sharing the storage and network bandwidth of many consumers in a local area, Peer-to-Peer networks offer content distributors the prospect of further improved content delivery performance for a given amount of expenditure on the provision and maintenance of content delivery equipment.

Content distributors can learn a consumer's identity in many ways, some of which are not known to the majority of consumers. For example, a content distributor can learn a user's network address and log content access requests arriving from that address in order to build a user profile. Sophisticated consumers may counter such identification techniques by accessing the content distributor's server through a Virtual Private Network, or by using the Tor browser-which orchestrates so-called onion routing in a network of peers between the consumer and the content distributor. However, despite such precautions, a consumer might nevertheless reveal their identity to a content distributor through payments for content made to the content distributor.

A separate problem in peer-to-peer networks is that some users free-ride on the storage and communication resources provided by other users.

The present disclosure helps to address these issues by providing techniques for making privacy-preserving payments in a peer-to-peer network.

SUMMARY

According to the present disclosure, there is provided a method of payment for content provision in a peer-to-peer content provision network, the method comprising:
  receiving a request for content;
  receiving a digital payment token having a first assignment layer, the digital payment token being generated by digitally signing, with a token service private key, data including a consumer ephemeral public key, and the first assignment layer being added by digitally signing, with a consumer ephemeral private key, data including the digital payment token and a payment service public key, the consumer ephemeral private key corresponding to the consumer ephemeral public key;
  in response to receiving the digital payment token from the consumer:
  enabling consumer access to at least a portion of the requested content stored on a peer in the peer-to-peer content provision network;
  adding a second assignment layer to the digital payment token by digitally signing, with a payment service private key, data including the digital payment token having the first assignment layer and a public key of the peer, the payment service private key corresponding to the payment service public key;
  sending, to the peer, the digital payment token with the second assignment layer.

A privacy-preserving content payment method which both maintains consumer anonymity, and rewards peers who contribute storage resources to the peer-to-peer network, is provided by having a consumer first prepare to make a payment for content by generating an ephemeral consumer public-private key pair, and then purchasing one or more digital payment tokens by sending the ephemeral consumer public key (but keeping the ephemeral consumer private key secret) and monetary payment to a token service.

The digital payment tokens returned by the payment service include the consumer public key but do not include an indication of the consumer's identity. The consumer then subsequently makes the content payment to a payment service by adding a first assignment layer to the digital payment token by combining the digital payment token with a public key of a payment service and digitally signing the combination with the consumer ephemeral private key.

The payment service is then able to pay a peer for providing storage resource to the peer-to-peer network by adding another assignment layer to the digital payment token by combining the digital payment token with the first assignment layer with a public key of the peer and digitally signing the combination with the payment service's private key.

An ephemeral public-private key pair is one which is used for a time-period which is sufficiently short to prevent or hinder attempts by others to tie together payments from a given consumer, and thereby build a profile of the consumer by listing content items purchased using the same payer identification. A new consumer ephemeral public-private key pair may, for example, be generated for each digital payment token, for each purchase of a batch of digital payment tokens, for each content item, or with a given frequency (e.g. hourly, more frequently than hourly, daily, more frequently than daily, weekly or more frequently than weekly).

In some embodiments, the method further comprises receiving from the consumer, a consumer ephemeral certificate in which data comprising the consumer public key is signed with a token service private key.

In some embodiments, the method further comprises verifying the digital signature on the digital payment token having a first assignment layer as a condition of enabling consumer access to the requested content.

In some embodiments, the content is a segment of a content item. This is especially useful in the case of peer-to-peer networks in which different segments of a content item are stored on different peers. This is the case, for example, with peer-to-peer networks operating in accordance with the BitTorrent protocol.

In some embodiments, the digital payment token includes a value field.

In some embodiments, the payment service generates two or more digital dividend payment tokens, each with a different second assignment layer, the sum of the value fields of the two or more digital dividend payment tokens with a second assignment layer being equal to, or less than, the value field in the digital payment token with a first assignment layer.

In some embodiments, the adding of the assignment layer is performed by software executing in a trusted execution environment. This tackles double-spending which a malicious actor might otherwise achieve by assigning the same digital payment token to two or more parties, or assigning two or more digital payment tokens with a second assignment layer, the sum of the values of the two or more digital payment tokens being greater than the value of the token with the first assignment layer.

In some embodiments, the digital payment token with the second assignment layer is sent in response to receiving a request for payment from the peer, the request for payment comprising:
 a peer ephemeral public key; and
 a peer ephemeral digital certificate in which data comprising the peer ephemeral public key is signed with the token service private key.

This distributes the problem of administering which peers are providing storage resources to the peers themselves.

BRIEF DESCRIPTION OF THE DRAWINGS

The above-described features and other features of the present disclosure, its nature and various advantages will be more apparent upon consideration of the following detailed description, taken in conjunction with the accompanying drawings, and in which.

DETAILED DESCRIPTION

Figure 1:
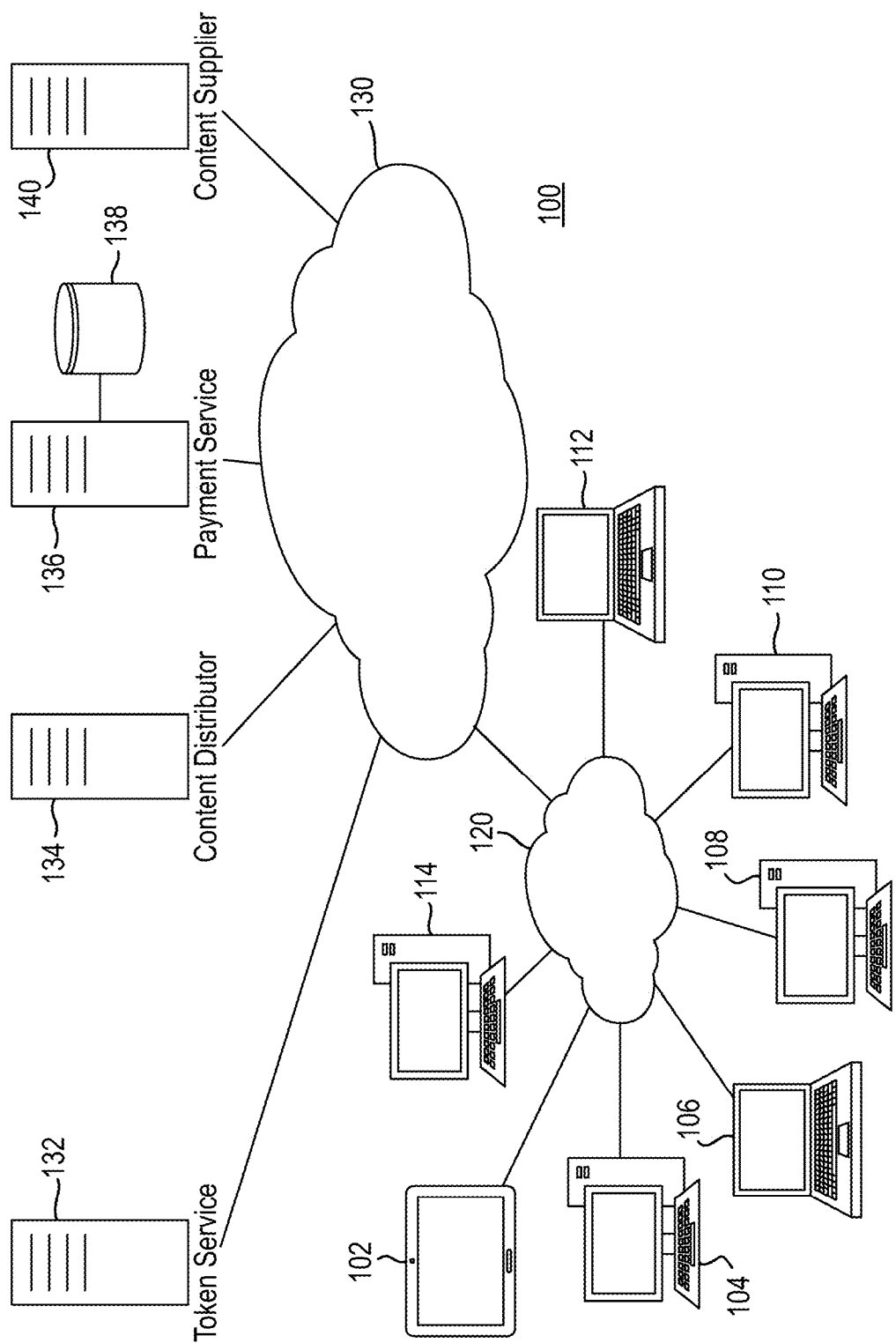
FIG. 1 illustrates a peer-to-peer content provision network.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Aspects of an illustrative embodiment of the disclosure will now be described with reference to the example shown in FIG. 1.

A content provision network 100 comprises a plurality of peers 102-114 including a user device 102, interconnected via a peer communications network 120, which is in turn connected to a content delivery management network 130. Whilst, for clarity of the drawing and description, the peer communications network 120 and the content delivery management network 130 are shown as interconnected networks, in practice they may form a single internetwork, and in particular, the two networks 120, 130 may be provided by the Internet.

In some cases, in order to hide the network addresses of the peers from the content delivery management network 130, the peers 102-114 might form an onion-routing network, or a network address translation node or virtual private network might be interposed between the peer communications network 120 and the content delivery management network 130.

The content delivery management network 130 is connected to a token server 132, a content distributor server 134, a payment server 136 with associated persistent storage 138 and a content supplier server 140. In some embodiments, two or more of these functions might be hosted on a single server or set of servers. In particular, a single server or set of servers under common control might offer a token service and a payment service. The persistent storage 138 associated with the payment server 136 stores content access revenue sharing rules.

Figure 2:
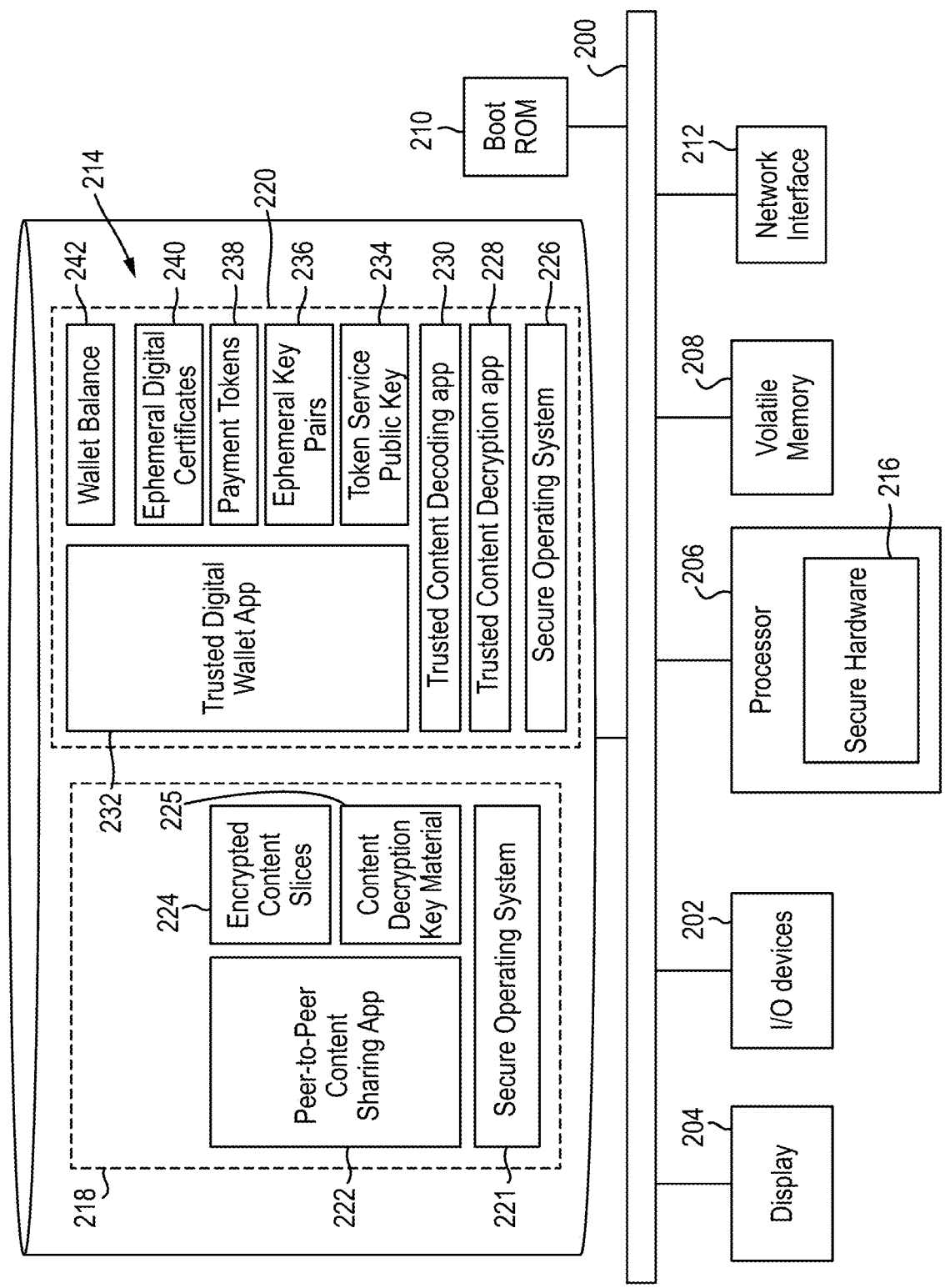
FIG. 2 illustrates the hardware and software architecture of a peer in the peer-to-peer network.

In some embodiments, the user device 102, and some or all of the other peers 104-114 have the hardware/software architecture illustrated in FIG. 2. The user device 102 comprises control circuitry and various input/output devices, the control circuitry comprising processing circuitry and storage. The processing circuitry includes one or more processors 206, one or more network interfaces 212, and one or more digital communication busses 200 which connect input/output devices 202 (such as a computer mouse, trackpad, touchscreen, display screen 204, keyboard), and storage including volatile memory 208, a boot ROM 210, and a persistent store 214 (for example solid-state storage). In some embodiments, the processor 206 includes secure hardware 216 (including, for example, unique cryptographic keys physically built into the processor at the time of manufacture) supporting secure execution of code signed with a corresponding public key.

The one or more network interfaces 212 may include a local area network interface, which local area network may form part of an internetwork, for example an intranet or the Internet and thus connect the user device 102 to the other peers 104 to 114.

The persistent store 214 contains code offering two execution environments 218, 220. A first part 218 of the persistent store stores an operating system program 221, a peer-to-peer content sharing app 222, encrypted slices of content 224 and content decryption key material 225. The peer-to-peer content sharing app 222 manages the storage of the encrypted slices of content and provides those encrypted slices of content to other peers 104-114. A second part 220 of the persistent store 214 contain programs offering and using a trusted execution environment, namely a secure operating system 226, a trusted content decryption module 228, a trusted content decoding module 230, and a trusted digital wallet app 232. The trusted digital wallet app 232 may store a Token Service public key (pk(TS)) 234, ephemeral public-private key pairs 236 generated by the trusted digital wallet app 232, one or more digital payment tokens 238 (which may include both issued tokens and assigned tokens as will be explained below), and one or more ephemeral digital certificates 240 issued by the Token Service certifying the use of respective ephemeral public keys in the content provision network 100. The trusted content decryption app, trusted content decoding app, and trusted digital wallet apps are designated as trusted apps because, for example, their code cannot be changed without causing the secure hardware 216 to refuse to execute the code since a public key operation performed on the binary code no longer gives a result which tallies with the private hardware key found in the secure hardware portion of the processor 206.

The trusted execution environment may be provided by a hardware-based system using, for example, ARM's TrustZone technology, or the Software Guard Extensions built into some Intel CPUs.

In other embodiments, other security mechanisms for providing trustworthiness of the trusted applications 228-232 might be used. For example, software-based isolation might be relied upon instead. One particular example of software-based isolation would be using a separate application running on an Android operating system.

The trusted digital wallet app 232 provides mechanisms both for making and receiving payments of tokens as will be described in more detail below. Some or all of the content management participants in the content provision network 100 which may accept and/or make token payments (for example, the payment server 136, the content distributor 134 and the content supplier 140) may also have the digital wallet application which may run in a trusted execution environment.

In the following description, messages are shown in curly brackets optionally followed by a cryptographic key that is used to encrypt the message. The notation for keys includes the name of the actor and type of the key. For example, pk(A) is a public key of the actor A and sk(B) is a private (secret) key of the actor B. A message M
encrypted by a public key of B is described as {M}pk(B). The notation also allows an additional subscript to specify that the key pair is ephemeral key pair. For example, an ephemeral public key of the actor B is marked as pk($B_{eph}$). Message structure fields, e.g., (M1 and M2), are presented as a comma separated list {M1, M2}. The character '#' is used to represent a cryptographic hash algorithm. In the notation used here, a message M signed by the actor A, which may, for example, take the form {M} {#} sk(A), is represented as Signed {M} sk(A).

A user may load tokens onto a User Device 102-114 either in advance of requiring content or at the time of requiring content.

Figure 3:
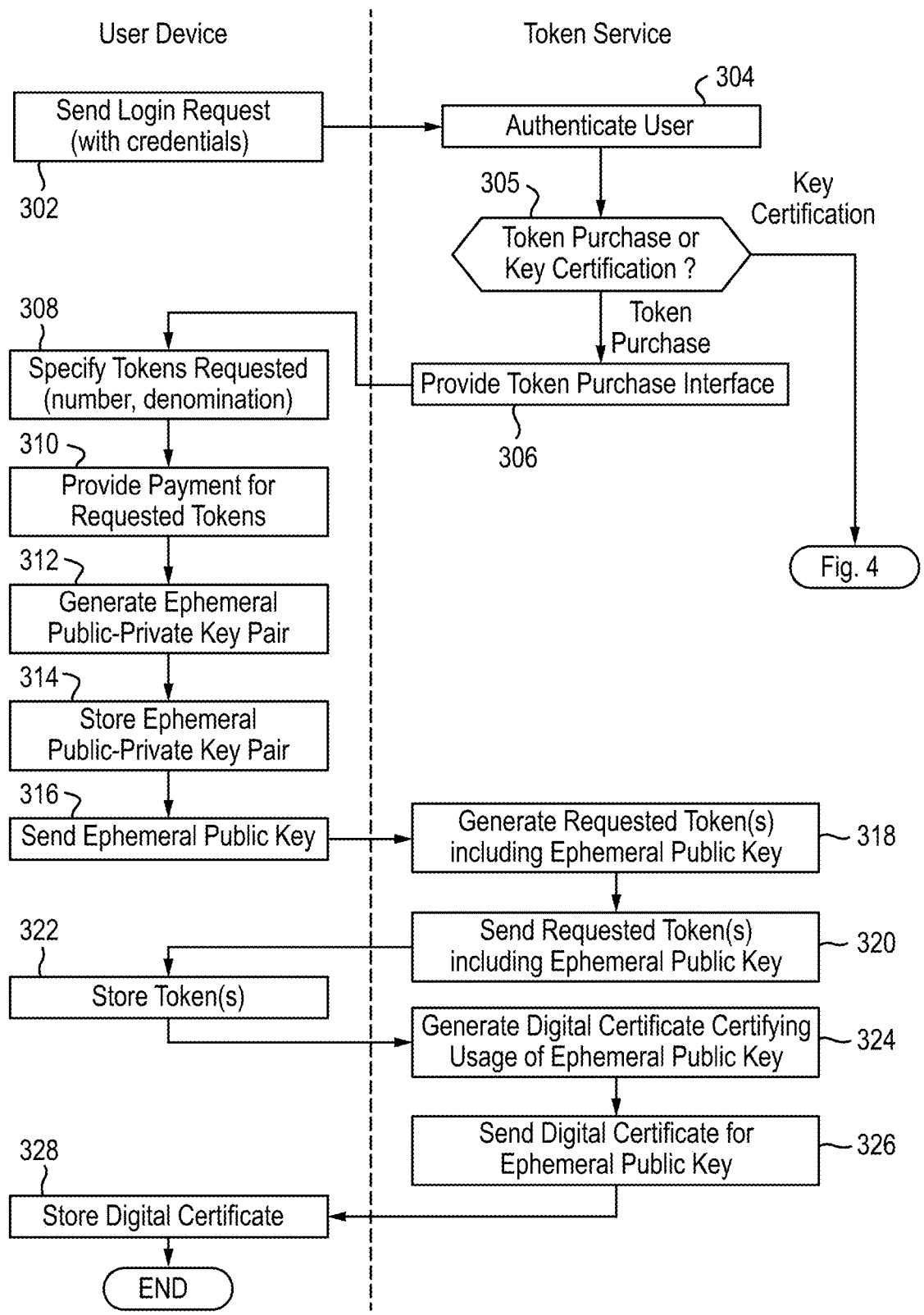
FIG. 3 is a flowchart illustrating a method by which a peer obtains digital payment tokens for use in the content provision network.

The process (FIG. 3) by which the trusted digital wallet application 232 loads tokens onto a peer, may begin with the User Device 102 (or any peer or any network participant having a digital wallet application) sending 302 a login request to the Token Service 132. Login may simply require the user to enter a username and password, or more complex authentication, for example utilizing OAuth2.

The Token Service 132 may then authenticate 304 the user, and provide 305 the user interface via the User Device 102 offering the user a choice between Token Purchase or Key Certification. Key Certification will be described below with reference to FIG. 4. If the user chooses Token Purchase then the Token Service 102 provides 306 a token purchase interface via the User Device 102. Using the token purchase interface, the user may then specify 308 the number of tokens requested, and their denomination. The user then provides payment 310 for the requested tokens, for example using a credit card payment, or by way of a bank transfer. The user device generates 312 an ephemeral public-private key pair to be used only in relation to the tokens purchased in the current token purchase transaction. By generating and using different private-public key pairs for different sets of tokens, the User Device 102 is able to hinder other participants in the content provision network from associating content requests using tokens purchased in a different token purchase transaction with content requests made by the same user in the current token purchase transaction.

The User Device 102 then stores 314 the ephemeral public-private key pair, keeping the ephemeral private key secret, and sends 316 the Ephemeral Public Key pk($U_{eph}$) to the Token Service 132.

The Token Service 132 then generates 318 the requested tokens including the Ephemeral Public Key provided by the User Device 102. Each token may take the format illustrated below.

Token:

Signed {pk($U_{eph}$), value, $R_A$, sequence, expiration} sk(TS)

In some embodiments, each token contains five fields, namely the ephemeral public key provided by the user device 102, an indication of the value of the token, a unique random or pseudorandom number $R_A$, an assignment sequence number, and an expiration time for the token.

In such embodiments, random number $R_A$ may be used in order to provide traceability if misuse of the payment system is detected. In some embodiments, on issuing a token, the Token Service 132 may make an entry in an audit log and later query that audit log to find connection details or other identification information (e.g. credit card details or bank details) relating to the person to whom the token was issued. In embodiments where a different ephemeral key pair is generated for each token, the token is unique without the random number ($R_A$) field, and random number ($R_A$) may not be required to provide traceability. Similarly, in some cases the expiration time may be specified with such precision that the token is unique without the random number ($R_A$) field. However, the random number field may be the only field that is directly generated by Token Service in cases where the client wallet software is able to use the same ephemeral key for multiple tokens and the expiration time is insufficiently precise to render the token unique.

The token does not include any indication of the identity of the user or the User Device 102.

Having generated the requested tokens, the Token Service 132 sends 320 the requested tokens to the User Device 102. In some embodiments, the tokens are sent in a message encrypted with the consumer ephemeral public key to ensure only the user device 102 can extract the tokens from the encrypted message.

On receiving the requested tokens, the User Device 102 stores 322 the tokens for use in future privacy-preserving payments.

The Token Service 132 then generates 324 a digital certificate certifying usage of the ephemeral public key in payment tokens in the content provision network 100. The certificate may be formatted as follows:

Certificate:
    Signed $\{pk(U_{eph})\}$ sk(TS)

The certificate does not include any indication of the identity of the user or the User Device 102. The Token Service 132 digitally signs the certificate with the private key corresponding to the Token Service public key 234 stored in each of the peers and participants of the content provision network 100.

Finally, the Token Service 132 sends 326 the digital certificate (note one digital certificate may relate to a large number of tokens purchased in a single transaction) to the User Device 102, which stores 328 the digital certificate for use in future payments.

In a two-party payment transaction, there are four scenarios, as illustrated in the table below:

|  | Payer Reveals Identity | Payer Hides Identity |
| --- | --- | --- |
| Payee Reveals Identity | Mutual Disclosure | Payee-only Identity Disclosure |
| Payee Hides Identity | Payer-only Identity Disclosure | Mutual Anonymity |

Any party which wishes to preserve its payment privacy can choose to use ephemeral public-private key pairs in a payment transaction. The example explained below in relation to FIG. 5 relates to a transaction in which both the payer and the payee seek to preserve their payment privacy. However, a party (payer or payee) which is not concerned to preserve its payment privacy may use a fixed public-private key pair in place of the use of an ephemeral public-private key pair.

Figure 4:
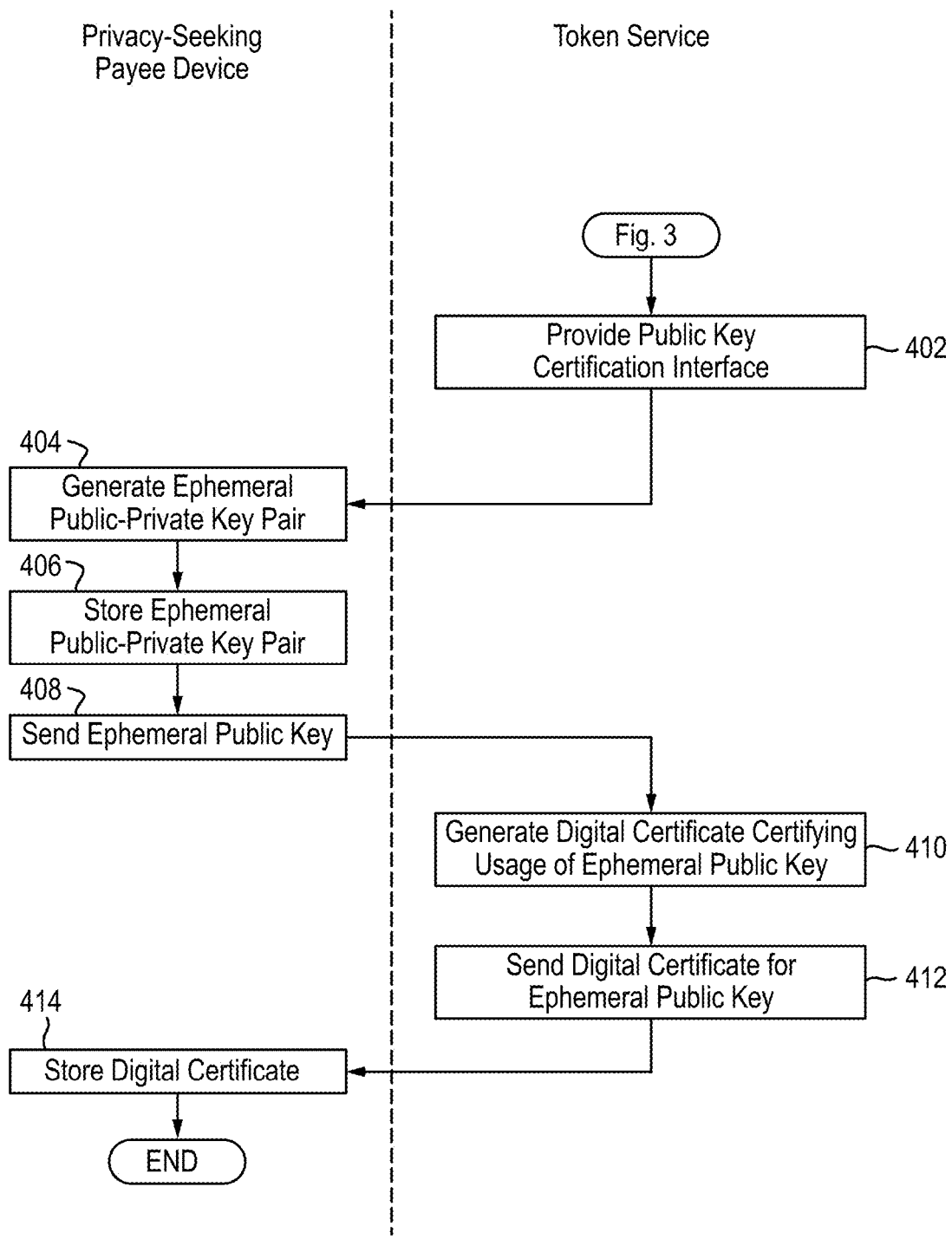
FIG. 4 is a flowchart illustrating a method by which a peer obtains digital certificates for use in accepting payments anonymously.

As mentioned above in relation to FIG. 3, in order to enable mutual anonymity, the Token Service 132 may additionally offer a key certification service as illustrated in FIG. 4.

On a peer device (102-114) (for the scenario envisaged in FIG. 4, the peer seeks to be paid anonymously) choosing the public key certification service, the Token Service 132 provides 402 the peer device (102-114) with a public-key certification interface. As the example here involves a peer-to-peer network, the user device (102), for example, may in some situations be acting as a consumer of content, and in other situations be storing content for delivery to other peers (104-114). In other words, the user device (102) is an example of a peer device (102-114).

To start the process of enabling the anonymous receipt of payment for storing content for other peers, the peer device (102-114) generates 404 an ephemeral public-private key pair. The peer device (102-114) then stores 406 the ephemeral public-private key pair, keeping the ephemeral private key secret, and sends 408 the Ephemeral Public Key $pk(U_{eph})$ to the Token Service 132.

The Token Service 132 then generates 410 a digital certificate certifying usage of the ephemeral public key in payment tokens in the content provision network 100. The certificate may be formatted as follows:

Certificate:
    Signed $\{pk(U_{eph})\}$ sk(TS)

The certificate does not include any indication of the identity of the peer. The Token Service 132 digitally signs the certificate with the private key corresponding to the Token Service public key 234 stored in peer device (102-114).

Finally, the Token Service 132 sends 412 the digital certificate (note one digital certificate may relate to a large number of tokens purchased in a single transaction) to the Peer Device (102-114), which stores 414 the digital certificate for use in future payments.

Figure 5:
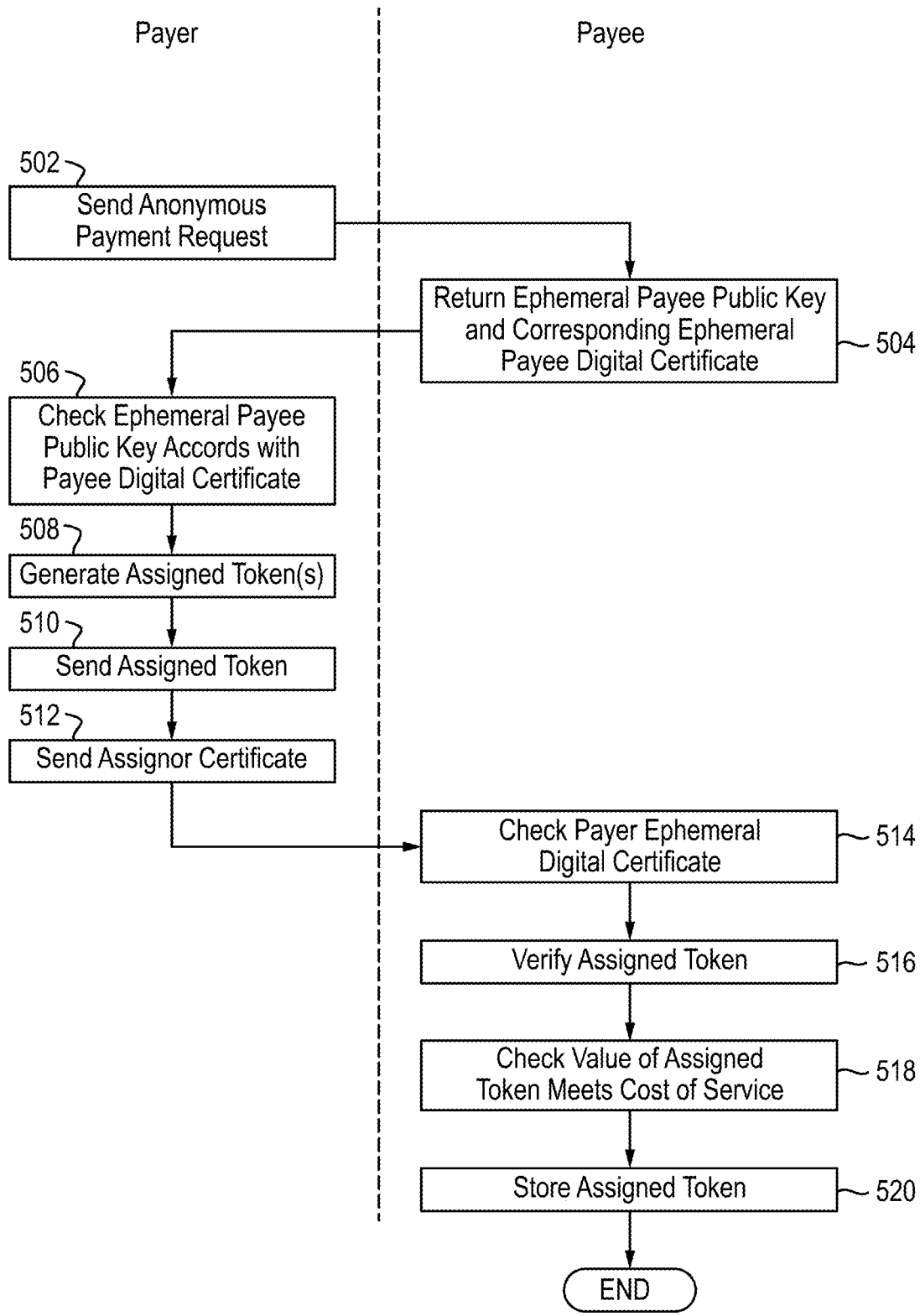
FIG. 5 is a flowchart illustrating the generation of one or more assigned tokens.

A token assignment process which may be used to make a privacy-preserving payment from one peer or participant (102-114, 134, 136, 140) to another peer or participant (102-114, 134, 136, 140) in the content provision network 100 will now be described with reference to FIG. 5. The payment process may be initiated by either the peer or participant making the payment ('payer') or the peer or participant receiving the payment ('payee'). In the example shown in FIG. 5, the payment process is initiated by the payer, hence the payer triggers the process by sending 502 an anonymous payment request to the payee.

The payee may respond to the payment request by sending 504 an ephemeral payee public key and corresponding ephemeral payee certificate (gained through the process described above in relation to FIG. 4) to the payer.

The payer checks 506 that the ephemeral public key accords with the payee digital certificate received in step 504. Now provided with the ephemeral payee public key, if the ephemeral payee public key matches the certificate, the payer generates 508 an Assigned Token which the payee can either redeem for money at the Token Service 132 or use for one or more payments to further peers or participants (102-114, 134, 136, 140). The Assigned Token may be formatted as below:

AssignedToken1:
    Signed $\{\{token\}, pk(P_{eph}), value, ++sequence\}$ $sk(U_{eph})$ The Assigned Token may comprise the token to be assigned (an 'embedded token'), and an added assignment layer. The payer adds the assignment layer by digitally signing, with the ephemeral private key paired with the ephemeral public key seen in the embedded token, a combination of i) the embedded token, ii) the ephemeral payee public key (obtained from the payee in step 504), iii) the value being assigned (which may be equal to or less than the value of the embedded token), and iv) an assignment sequence number (the notation '++sequence' describes that the sequence number found in the embedded token is incremented and then used inside the message body to be signed).

To prevent double-spending of tokens in the content provision system, the trusted code of the trusted digital wallet app 232 on each peer or participants (102-114, 134, 136, 140) may only enable:
    i) the generation of a single Assigned Token which matches the value of a received token or Assigned Token; or
    ii) the generation of a plurality of Assigned Tokens whose combined value matches the value of a received token or Assigned Token.

The payer then sends 510 the Assigned Token to the payee, and sends 512 the payer ephemeral digital certificate certifying the ephemeral payer public key included in the embedded token (the ephemeral digital certificate, it will be remembered, was supplied with the token by the Token Service 132).

On receipt of the Assigned Token and the payer ephemeral digital certificate, the payee checks 514 the payer ephemeral digital certificate for the ephemeral public key $pk(P_{eph})$ found in the Assigned Token using the locally-stored Token Service public key 234. Assuming that check is passed, the Token Assign verifies 516 the Assigned Token using the verification process described in relation to FIG. 6 below.

The Token Assignee may further check 518 that the value of the token meets the cost of a service being requested, and may store 520 the Assigned Token in the protected memory space of the Trusted Digital Wallet app 232.

Figure 6:
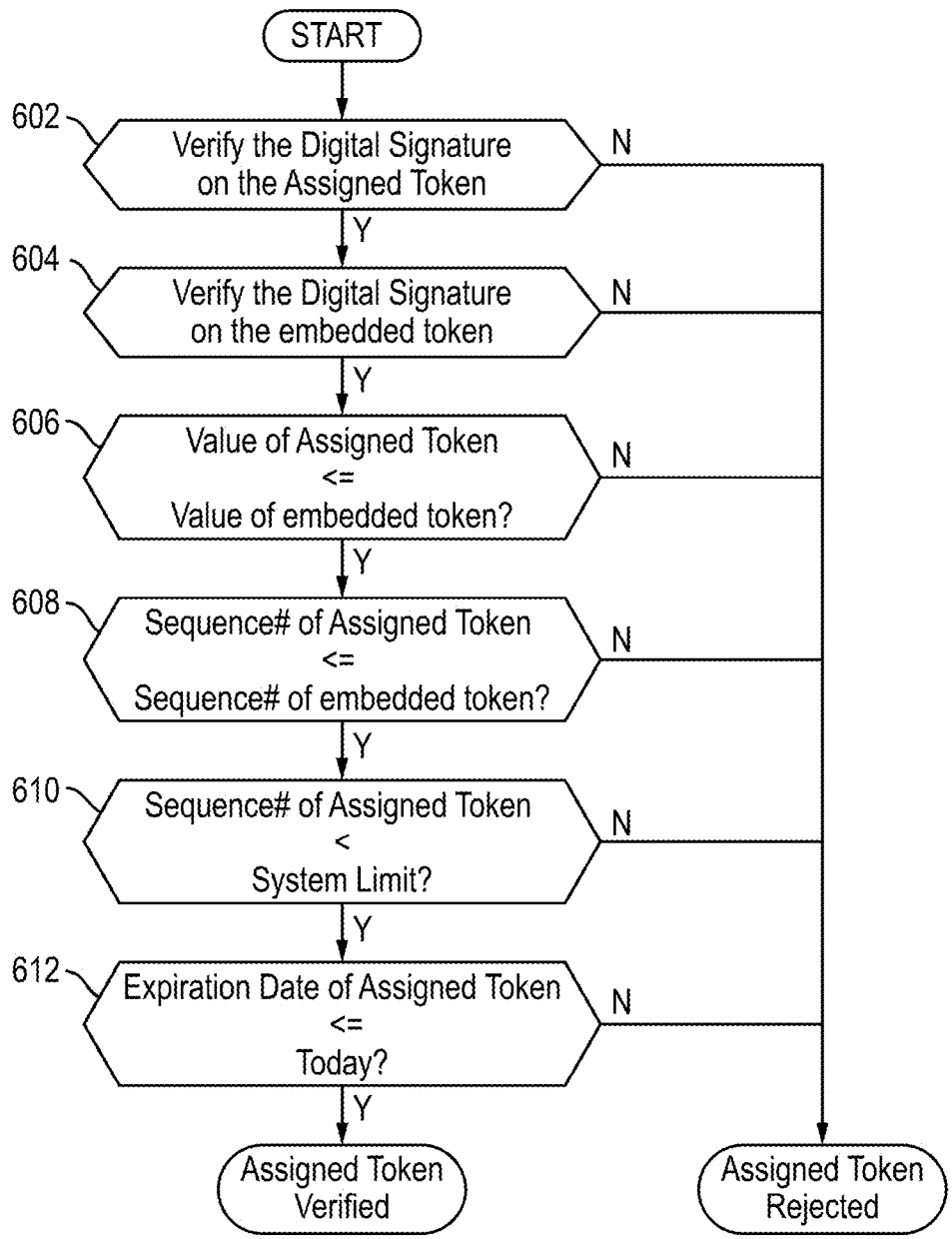
FIG. 6 is a flowchart illustrating the verification of an assigned token by a participant in the content provision network.

Turning now to FIG. 6, on receiving an Assigned Token, the recipient's trusted digital wallet app 232 may check the Assigned Token—by, for example:

i) using the ephemeral public key (pk($U_{eph}$)) found in the token embedded in the Assigned Token, verifying 602 the ephemeral private key sk($U_{eph}$) used in the processing of adding the assignment layer pairs with the ephemeral public key pk($U_{eph}$) included in the embedded token;

ii) using the Token Service's public key, verifying 604 the Token Service's signature on the embedded token;

iii) checking 606 that the value in the Assigned Token is less than or equal to the value in the embedded token.

iv) checking 608 that the sequence number in the Assigned Token is higher than the sequence number in the embedded token;

v) checking 610 that the sequence number ('++sequence') in the Assigned Token does not exceed the system limit for the sequence number;

vi) checking 612 that the expiration date/time of the embedded token has not passed.

If any of these checks and verifications are not met, then the payee may refuse to accept the payment and may message the payer to indicate the refusal to accept the payment.

An application of some of the above anonymous payment primitives to a method of peer-to-peer content provision will now be explained with reference to FIG. 7. The method offers anonymity to a user of the peer-to-peer network whilst enabling reward of different actors in the content provision process, and in particular enables rewarding peers for providing storage resources to the peer-to-peer network.

Figure 7:
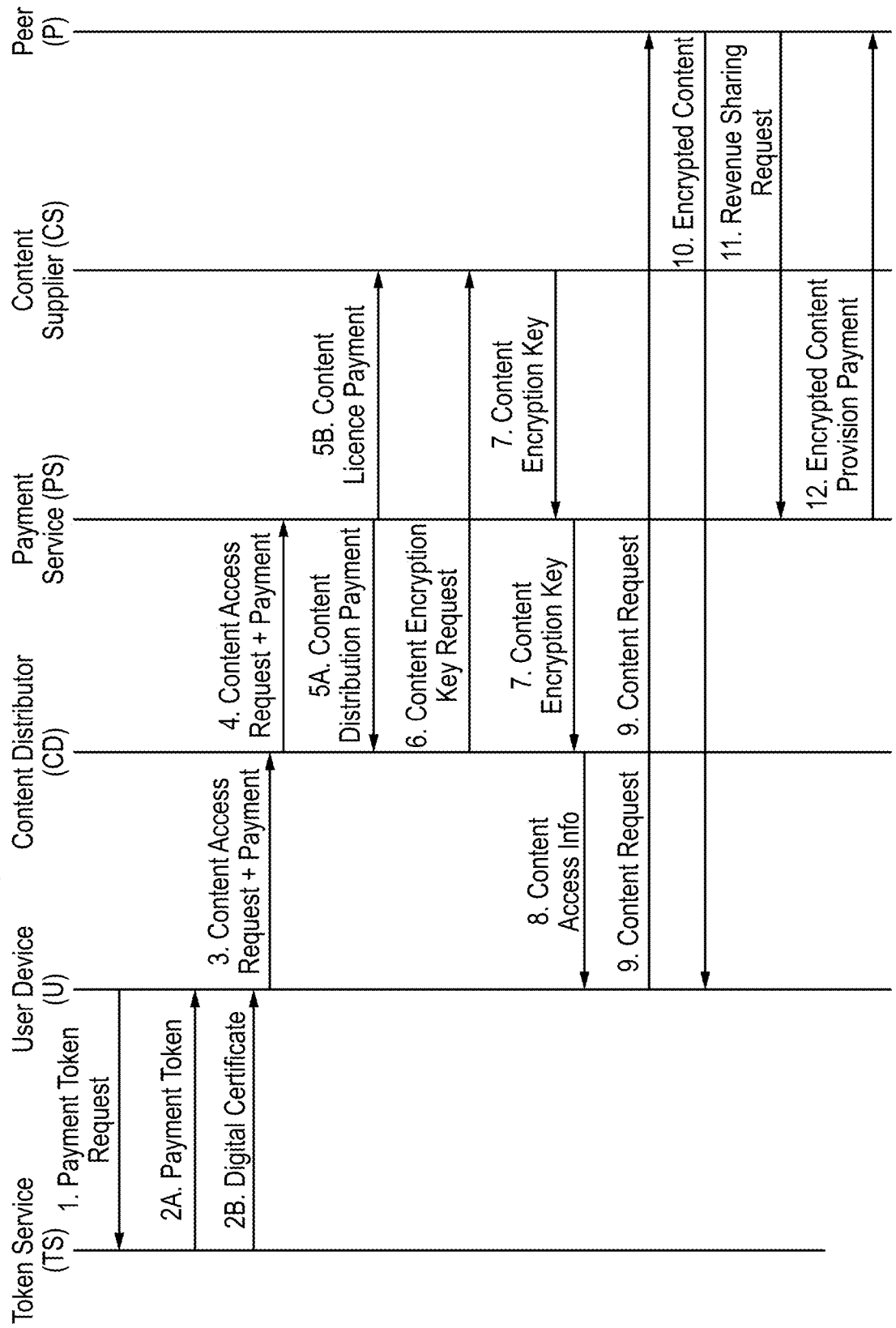
FIG. 7 is a communication flow diagram illustrating how participants of the content provision network transact in order to provide a user with content, according to an aspect of the disclosure.

FIG. 7 shows messages passed between the servers 132-140 and peers 102-114 of the content provision network described above in relation to FIG. 1. In some embodiments, the format of the messages sent might use a data structure envelope format such XML (extensible Markup Language), JSON (JavaScript Object Notation) or MIME (Multipurpose Internet Mail Extensions). It should be noted that order of the messages may, in some embodiments, differ from the order shown.

In some embodiments, the user is able to purchase an entire content item using the process illustrated in FIG. 7—the content item might be a film or a TV program, but it may be short-form user-generated content. Should regulators continue to pressure the advertising industry to protect user privacy, content distributors in general, and social media apps in particular, will face an engineering need to provide a platform which can efficiently provide for payment for short-form content.

In other embodiments, content items are delivered slice-by-slice, with payment being made for each slice (a 'pay-per-use' content provision system). The method of FIG. 7 will now be described in relation to such an embodiment.

The method begins with the User Device 102 obtaining tokens from the Token Service as described above in relation to FIG. 3 (messages 1, 2A and 2B). In addition, other nodes in the network (for example the Payment Server 136, the Content Supplier 140, the Peers 102-114 and the Content Distributor 134) may use the method described above in relation to FIG. 4 to obtain public key certificates to enable them to anonymously receive payment from other participants in the network in accordance with the process described above in relation to FIGS. 5 and 6.

Having obtained some digital payment tokens, the User Device 102 requests a slice of content by sending the Content Distributor 134 a content request message along with a token to pay for the slice of content (message 3).

The content access request and payment message may be formatted as follows (in this description '||' represents concatenation)

Message 3:
{ContentID, slice-info, pk($U_{eph}$)}||Signed {{token}, pk($PS_{eph}$), value, ++sequence} sk($U_{eph}$)

Whilst in the above example message, the public key of the Payment Service is shown to be ephemeral, it may instead be fixed since the Payment Service may not require anonymity within the system. The Payment Service may run similar digital wallet software to that provided to each peer, and in such cases, the software may provide an option to use fixed public-private key pairs instead of ephemeral keys (e.g. by giving the user an anonymity option as part of the user configuration of the software). The administrator of the Payment Service may then choose to forgo anonymity in the system by electing to use a fixed public-private key pair.

In some embodiments, the content access request and payment message (Message 3) comprises a content access request part comprising a content item identifier, a slice identifier and an ephemeral public key concatenated with an Assigned Token in effect making the token payable to the Payment Service. In other embodiments, the content slice identifier might be a digital hash obtained by executing a one-way digital hash function on the slice data. Despite the payment message being repeated by the Content Distributor 134 (message 4), the Content Distributor 134 is unable to profile the user on the basis of the Assigned Token because the embedded token contains an ephemeral public key (pk$U_{eph}$) instead of the identity of the user.

As will be explained in more detail below, providing the ephemeral public key of the user in the content access request part ultimately enables the Content Supplier to associate a license payment with a content encryption key request message.

In other embodiments, the Assigned Token may include a fixed public key of the Payment Service instead of an ephemeral public key. Such embodiments reflect the fact that in many content provision scenarios, the Payment Service will not be concerned with concealing its identity from user devices.

In some embodiments, the content request and payment message is formatted as follows:

Message 3:
{ContentID, slice-info, pk($U_{eph}$), {AssignedToken} pk(PS)

In such embodiments, by encrypting the assigned token with the public key of the Payment Service 136, even if the token is of a type which includes the user's identity (or the user device's identity), the user's identity is hidden from the Content Distributor 134 because it does not have access to the Payment Service's private key. Instead of using asymmetric encryption, the token may be encrypted using a symmetric encryption key shared between the user device and the Payment Service.

On receiving the content access request and payment message, the Payment Service 136 may divide the payment amongst the peers or participants (102-114, 134, 136, 140) involved in the provision of the requested content to the user. To do this, the Payment Service 136 may verify the Assigned Token as explained above in relation to FIG. 6.

The Payment Service then splits the value in the Assigned Token (it will be seen from what follows that the digital payment tokens in this embodiment are divisible) between the Content Distributor 134 (message 5A), the Content Supplier 140 (message 5B) and the Peer Node 104-114 (message 12 described below). The split may be made in accordance with revenue sharing rules stored in the persistent store 138 in communication with the Payment Service 136.

To forward a share of the value of the received Assigned Token to, for example, the Content Distributor 134, the Payment Service 136 generates another Assigned Token (AssignedToken2). The method for generating the (twice-) Assigned Token, and the format of the (twice-) Assigned Token are similar to the generation and format of the Assigned Token as described above in relation to FIG. 5, but the place of the embedded token is taken by the received Assigned Token (AssignedToken1 in this example). The format of the (twice-) Assigned Token as passed to the Content Distributor may thus be:

AssignedToken2:
  Signed {{AssignedToken1}, pk($CD_{eph}$), value, ++sequence} sk($PS_{eph}$)

It will be seen that the further assignment is performed by adding a further assignment layer to the AssignedToken1. The presence of the Content Distributor's ephemeral public key indicates that the Content Distributor is the payee, and the use of the Payment Service's private key to sign the combination indicating that the Payment Service is the payer.

Whilst in the above AssignedToken2 the public key of the Content Distributor is shown to be ephemeral, it may instead be fixed since the Content Distributor may not require anonymity within the system. The Content Distributor may run similar digital wallet software to that provided to each peer, and in such cases, the software may provide an option to use fixed public-private key pairs instead of ephemeral keys (e.g. by giving the user an anonymity option as part of the user configuration of the software). The administrator of the Content Distributor may then choose to forgo anonymity in the system by electing to use a fixed public-private key pair.

On receiving the (twice-) Assigned Token, the Content Distributor 134 may perform the verification as described above in relation to FIG. 6, and may additionally perform the following checks on the outermost layer of the (twice-) Assigned Token:
  i) using the ephemeral public key found in the embedded Assigned Token (AssignedToken1 in this example), verify the digital signature of the (twice-) Assigned Token; and
  ii) check that the value in the (twice-) Assigned Token is less than or equal to the value in the embedded Assigned Token;
  iii) check that the sequence number in the (twice-) Assigned Token does not exceed the system limit for the sequence number; and
  iv) check that the sequence number in the (twice-) Assigned Token is higher than the sequence number in the embedded Assigned Token.

On receiving the Assigned Token (which, it will be realized is represented by message 5A in the diagram), the Content Distributor may check that the value in the token meets the cost of distributing the slice of content, and if so, may send a content encryption key request (Message 6) to the Content Supplier 140. The message may be formatted as shown below:

Message 6:
  {ContentID, slice-info, pk($U_{eph}$)}

On receiving the content encryption key request message (message 6), the Content Supplier 140 may reply with a content encryption key message (message 7). It will be understood that a similar payment process as explained above in relation to the payment of the Content Distributor 134 may first be performed between the Payment Service 136 and the Content Supplier 140. The sending of the content encryption key message may be conditional on the value of the Assigned Token passed to the Content Supplier meeting the cost of supplying a license for the content slice in question. The content encryption key message may be formatted as shown below:

Message 7:
  {Content Encryption Key, Initialization Vector, ContentID, slice-info} pk($U_{eph}$)}

The content encryption key message (message 7) comprises key material, and the content slice identifier. The Content Supplier may encrypt at least the content slice identifier with the ephemeral public key of the user (known by the content supplier owing to its presence in the content encryption key request message (Message 6). Depending on the cryptographic mode used for encrypting the content, the key material may comprise a content encryption key and an initialization vector. In some cases, the cryptographic mode chosen may not require an Initialization Vector. In some embodiments in which an Initialization Vector is used, only the Content Encryption Key part of the key material is encrypted with the user's ephemeral public key.

In some embodiments, each slice is encrypted separately and the Initialization Vector is returned with the Content Encryption Key for each slice. In other embodiments, there is a Content Encryption Key (CEK) that is static for the entire media, but a slice-specific Initialization Vector (IV) for each slice, the Initialization Vector being a vector needed to generate the key for a media slice together with the static Content Encryption Key (CEK).

On receiving the content encryption key message (which is a reply to the request made in message 4), the Content Distributor generates a contact access info message (message 8) and sends it to the User Device 102, thereby providing a reply to the request made in message 3.

The User Device 102 receives the content access info message (message 8), and passes the key material to the peer-to-peer content sharing app 222. The peer-to-peer content sharing app 222 may store the key material along with an indication of encrypted content slice the key material enables decryption of.

In some embodiments, on receiving the content access info message, the User Device 102 sends a content request (message 9) to the Peer 104-114. The content request may be formatted as shown below:

Message 9:
  {ContentID, slice-info} pk($U_{eph}$)

The Peer 104-114 may then return the encrypted slice to the user device (message 10), and the user device 102 may use key material provided in the contact access info message (message 8) to decrypt the encrypted content and present it to the user on display 204.

The Peer 104-114 may also send a revenue sharing request (message 11) to the Payment Service 136 which may respond with an encrypted content provision payment (message 12) to compensate the peer for providing storage and communication resource to the content provision network 100.

It will be seen from the signal flow in FIG. 7 how the above-described method meets the twin aims of providing anonymity to a content consumer, and providing payment for those peers contributing resources to the peer-to-peer content delivery network.

The confidentiality and integrity of the tokens may be handled both at rest and in transit. The trusted digital wallet app may implement a secure storage and transmission protocol such as Transport Layer Security or a Diffie-Hellman based secure channel between (certified) peers and participants.

In some embodiments, dynamic pricing may be used to determine the amount payable to storage providers in the peer-to-peer network. The price of storage might be adjusted in dependence upon one or more of supply and demand, the region in which the peer operates, the peer's measured/permitted networking speed (that also may vary during the day), storage duration, and amount of downloaded content.

Figure 8:
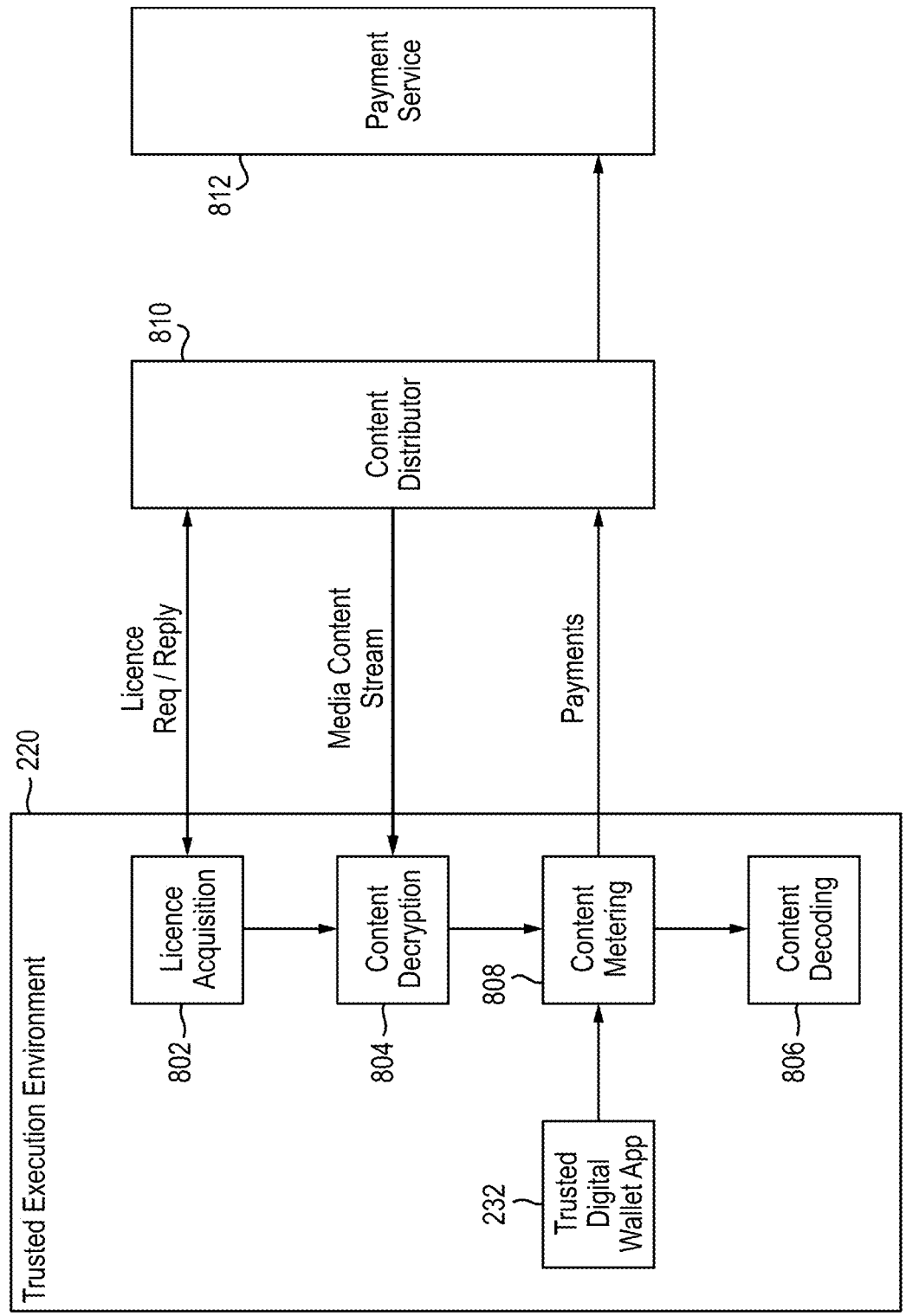
FIG. 8 is a schematic diagram showing a system in which aggregation of payments is used to reduce the number of payment messages.

FIG. 8 illustrates how, in some embodiments, aggregation of payments is used to reduce the number of payment messages transmitted between nodes in a content provision network.

The system of FIG. 8 includes a license acquisition module 802, a content decryption module 804, and a content decoding module 806 which are run in a trusted execution environment 220 provided on a node of the content provision network. A content metering module 808 is present in some embodiments to meter content in order to reduce the number of payment messages sent by the user device 102 on which the trusted execution environment is being provided.

Content encryption key material, and encrypted content is received by the node from a Content Distributor 810. In return, the content metering module 808 occasionally sends payment messages to a Payment Service 812 via the Content Distributor 810.

Figure 9:
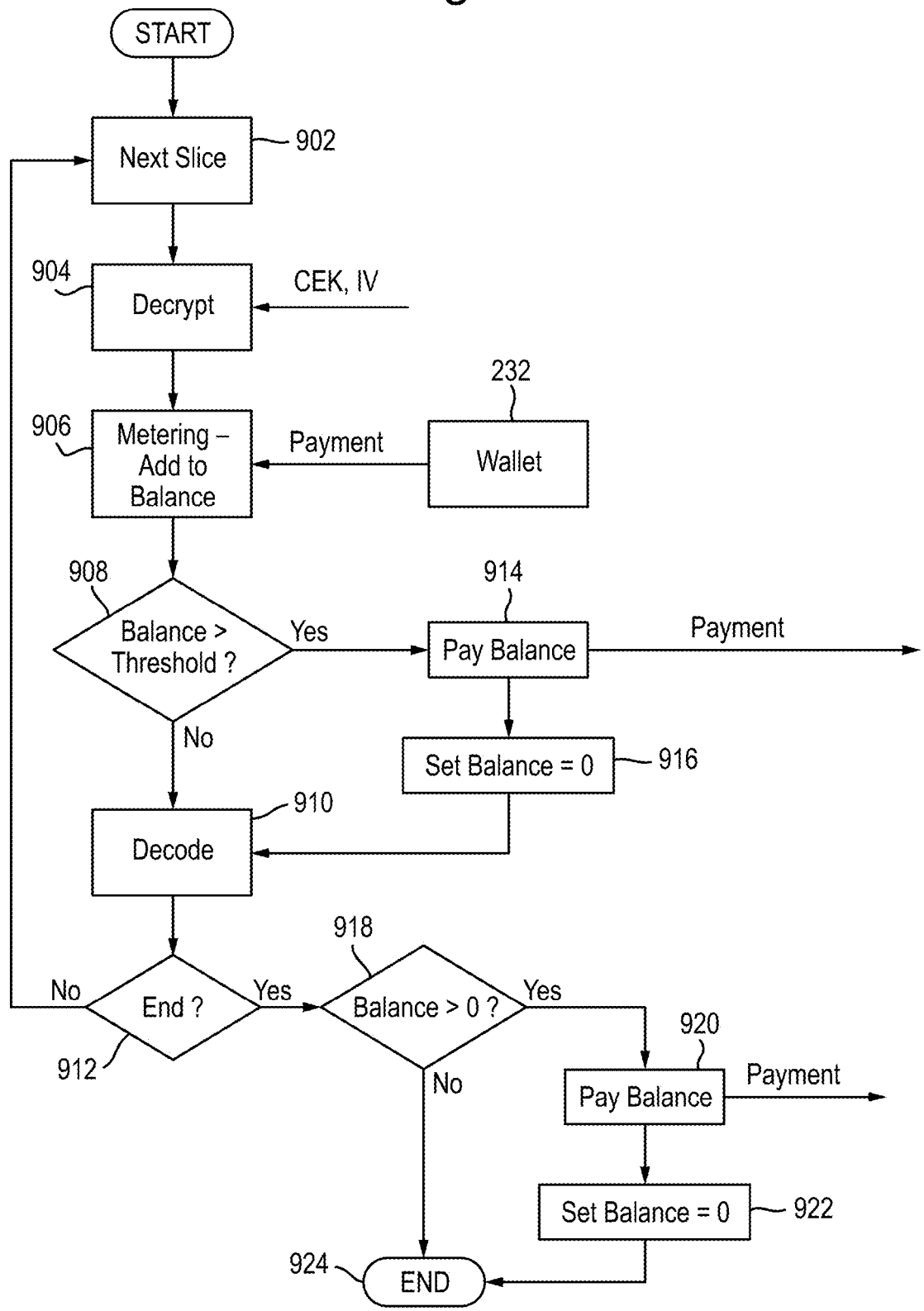
FIG. 9 is a flowchart illustrating the operation of the system of FIG. 8.

The operation of the node (FIG. 9) involves the node receiving 902 an encrypted slice of content, decrypting 904 the encrypted slice of content using the content encryption key material received via the content distributor node 810, and then incrementing a meter by an amount corresponding to the amount of content received. The content, may, for example, be provided in short slices of content (e.g. thirty seconds or less). The slices may correspond to segments used in adaptive bit-rate streaming schemes such as MPEG-DASH, and thus be between two and ten seconds long. There may be a preset price per slice, per time or per byte. The metering component 808 keeps a running outstanding balance measure which records the price of content received since the last payment was made to the payment service 812. As the outstanding balance increases, assigned tokens of sufficient value to meet the outstanding balance are taken from the digital wallet app 232.

After the metering step 906, the outstanding balance is compared 908 to a threshold. If the threshold has not yet been met, the decrypted content is decoded 910. A test 912 is then performed to determine whether the consumption of the content has been ended by the user. If not, another encrypted slice of content is received 902 and the above process is repeated.

If, on the other hand, the outstanding balance meets or exceeds the payment threshold, then the tokens received from the digital wallet app are sent 914 to the content distribution node 810 which in turn forwards them to the payment service 812. The outstanding balance is then reset 916 to zero. Control then returns to decoding step 910.

If the test 912 finds that the consumption of content has been ended by the user, then a further test 918 finds whether there is any outstanding balance. If there is not, then the process ends 924. If there is, then the balance is paid 920 in the manner discussed above in relation to payment step 914, and the outstanding balance is reset 922 to zero, before the process ends 924.

The above embodiments may be applied to social media platforms that may prefer to monetize user-generated content on a pay-per-use basis rather than, or in addition to advertising. Users may be allowed to act both as media content consumers and media content creators (e.g. video bloggers, prosumers). For example, a user may want only to check goals of a football match, quickly check parts of an interesting TV program, read one article from the newspaper, or listen to just one song or a part of a song.

It will be seen how, in some embodiments, a peer-to-peer content provision network implements a privacy-preserving payment mechanism for rewarding actors in the network (for example, a content supplier, a content distributor and storage-contributing peers). In those embodiments, to reward some or all of those actors, a user device obtains, from a token service, anonymous digital payment tokens which include an ephemeral public key. Payment is achieved by adding an assignment layer to the token which involves combining a payee ephemeral public key with the token, and applying a digital signature to the combination using the ephemeral private key corresponding to the ephemeral public key in the token. Subsequent assignments can be made by the payee by adding a further assignment layer to the token using a payee ephemeral private key which pairs with the payee ephemeral public key in the received token. In some embodiments, a payment service can divide a payment from the user between actors in the network. In some embodiments, traceability is provided by the token service recording the identity of the user to whom each token is issued. In some embodiments, security is improved by executing software which performs the addition of the assignment layers in a trusted execution environment.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method of payment for content provision in a peer-to-peer content provision network, the method comprising:
   receiving a request for content;
   receiving a digital payment token having a first assignment layer, the digital payment token being generated by digitally signing, with a token service private key, data including a consumer ephemeral public key, and the first assignment layer being added by digitally signing, with a consumer ephemeral private key, data including the digital payment token and a payment service public key, the consumer ephemeral private key corresponding to the consumer ephemeral public key;
   in response to receiving the digital payment token from the consumer:
      enabling consumer access to at least a portion of the requested content stored on a peer in the peer-to-peer content provision network;
      adding a second assignment layer to the digital payment token by digitally signing, with a payment service private key, data including the digital payment token having the first assignment layer and a public key of the peer, the payment service private key corresponding to the payment service public key;
      sending, to the peer, the digital payment token with the second assignment layer.

2. The method of claim 1, further comprising receiving from the consumer, a consumer ephemeral certificate in which data comprising the consumer public key is signed with a token service private key.

3. The method of claim 1, further comprising verifying the digital signature on the digital payment token having a first assignment layer as a condition of enabling consumer access to the requested content.

4. The method of claim 1, wherein the content is a segment of a content item.

5. The method of claim 4, wherein the digital payment token with the first assignment layer represents a single payment which aggregates a plurality of payments for a plurality of respective segments of a content item.

6. The method of claim 1, wherein the digital payment token includes a value field.

7. The method of claim 6 wherein a payment service generates two or more digital dividend payment tokens, each with a different second assignment layer, the sum of the value fields of the two or more digital dividend payment tokens with a second assignment layer being equal to, or less than, the value field in the digital payment token with a first assignment layer.

8. The method of claim 1, wherein the adding of one or both of the first and second assignment layer is performed by software executing in a trusted execution environment.

9. The method of claim 1, wherein the digital payment token with the second assignment layer is sent in response to receiving a request for payment from the peer, the request for payment comprising:
   a peer ephemeral public key; and
      a peer ephemeral digital certificate in which data comprising the peer ephemeral public key is signed with the token service private key.

10. A system for payment for content provision in a peer-to-peer content provision network, the system comprising control circuitry configured to:
   receive a request for content;
   receive a digital payment token having a first assignment layer, the digital payment token being generated by digitally signing, with a token service private key, data including a consumer ephemeral public key, and the first assignment layer being added by digitally signing, with a consumer ephemeral private key, data including the digital payment token and a payment service public key, the consumer ephemeral private key corresponding to the consumer ephemeral public key;
   in response to receiving the digital payment token from the consumer:
      enable consumer access to at least a portion of the requested content stored on a peer in the peer-to-peer content provision network;
      add a second assignment layer to the digital payment token by digitally signing, with a payment service private key, data including the digital payment token having the first assignment layer and a public key of the peer, the payment service private key corresponding to the payment service public key; and
      send, to the peer, the digital payment token with the second assignment layer.

11. The system of claim 10, wherein the control circuitry is further configured to receive from the consumer, a consumer ephemeral certificate in which data comprising the consumer public key is signed with a token service private key.

12. The system of claim 10, wherein the control circuitry is further configured to verify the digital signature on the digital payment token having a first assignment layer as a condition of enabling consumer access to the requested content.

13. The system of claim 10, wherein the content is a segment of a content item.

14. The system of claim 13, wherein the digital payment token with the first assignment layer represents a single payment which aggregates a plurality of payments for a plurality of respective segments of a content item.

15. The system of claim 10, wherein the digital payment token includes a value field.

16. The system of claim 15 further comprising a payment server arranged in operation to generate two or more digital dividend payment tokens, each with a different second assignment layer, the sum of the value fields of the two or more digital dividend payment tokens with a second assignment layer being equal to, or less than, the value field in the digital payment token with a first assignment layer.

17. The system of claim 10, wherein the adding of one or both of the first and second assignment layer is performed by software executing in a trusted execution environment.

18. The system of claim 10, wherein the digital payment token with the second assignment layer is sent in response to receiving a request for payment from the peer, the request for payment comprising:
   a peer ephemeral public key; and
      a peer ephemeral digital certificate in which data comprising the peer ephemeral public key is signed with the token service private key.

19. A non-transitory computer-readable medium tangibly embodying instructions executable by a processor to:
   receive a request for content from a peer in a peer-to-peer content provision network;

receive a digital payment token having a first assignment layer, the digital payment token being generated by digitally signing, with a token service private key, data including a consumer ephemeral public key, and the first assignment layer being added by digitally signing, with a consumer ephemeral private key, data including the digital payment token and a payment service public key, the consumer ephemeral private key corresponding to the consumer ephemeral public key;

in response to receiving the digital payment token from the consumer:

enable consumer access to at least a portion of the requested content stored on a peer in the peer-to-peer content provision network;

add a second assignment layer to the digital payment token by digitally signing, with a payment service private key, data including the digital payment token having the first assignment layer and a public key of the peer, the payment service private key corresponding to the payment service public key;

send, to the peer, the digital payment token with the second assignment layer.

20. The computer-readable medium of claim 19, further tangibly embodying instructions executable by a processor to receive from the consumer, a consumer ephemeral certificate in which data comprising the consumer public key is signed with a token service private key.

\* \* \* \* \*